United States Patent
E et al.

(10) Patent No.: US 12,200,625 B2
(45) Date of Patent: Jan. 14, 2025

(54) POWER CONSUMPTION CONTROL METHOD, CHIP SYSTEM, AND TERMINAL DEVICE

(71) Applicant: Honor Device Co., Ltd., Shenzhen (CN)

(72) Inventors: Nan E, Shenzhen (CN); Jiantao Xue, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 441 days.

(21) Appl. No.: 17/774,819

(22) PCT Filed: Dec. 8, 2020

(86) PCT No.: PCT/CN2020/134564
§ 371 (c)(1),
(2) Date: May 5, 2022

(87) PCT Pub. No.: WO2021/135859
PCT Pub. Date: Jul. 8, 2021

(65) Prior Publication Data
US 2022/0408366 A1     Dec. 22, 2022

(30) Foreign Application Priority Data
Jan. 3, 2020   (CN) .......................... 202010005401.1

(51) Int. Cl.
*H04W 52/02* (2009.01)
*H04W 72/0446* (2023.01)
*H04W 72/23* (2023.01)

(52) U.S. Cl.
CPC ..... *H04W 52/0258* (2013.01); *H04W 52/028* (2013.01); *H04W 72/0446* (2013.01); *H04W 72/23* (2023.01)

(58) Field of Classification Search
CPC ........... H04W 52/0258; H04W 52/028; H04W 52/0254; H04W 52/0251; H04W 52/0225;
(Continued)

(56) References Cited

U.S. PATENT DOCUMENTS 10,080,125 B2   9/2018   Shellhammer et al.
10,833,833 B2   11/2020  Wang et al.
(Continued)

FOREIGN PATENT DOCUMENTS

CN   103889036 A   6/2014
CN   104137601 A   11/2014
(Continued)

OTHER PUBLICATIONS

Asustek, "PDSCH resource allocation restriction for power saving," 3GPP TSG RAN WG1 Meeting #94bis, R1-1811458, Chengdu, China, Oct. 8-12, 2018, 2 pages.

*Primary Examiner* — Farid Seyedvosoghi
(74) *Attorney, Agent, or Firm* — Leydig, Voit & Mayer, Ltd.

(57) ABSTRACT

A power consumption control method, a chip system, and a terminal device in the field of terminal technologies is provided. The method includes: detecting, by a terminal device, a screen state and data traffic of the terminal device; and switching the terminal device from a normal working mode to a low power mode when the screen state is a screen-off state and the data traffic is less than or equal to a preset traffic threshold. In the low power mode, the terminal device does not receive downlink data, and current in a radio frequency path of the terminal device drops to a preset current, where the preset current is less than a current value of the radio frequency path in the normal working mode.

17 Claims, 10 Drawing Sheets

(58) Field of Classification Search
CPC ......... H04W 52/0212; H04W 52/0248; H04W 52/0261; H04W 72/0446; H04W 72/23; Y02D 30/70
See application file for complete search history.

(56) References Cited

U.S. PATENT DOCUMENTS

| | | |
|---|---|---|
| 2009/0016252 A1 | 1/2009 | Ho et al. |
| 2013/0250825 A1 | 9/2013 | Gosal et al. |
| 2014/0179235 A1 | 6/2014 | Huang |
| 2014/0254444 A1 | 9/2014 | Kim et al. |
| 2016/0227522 A1 | 8/2016 | Dinan |
| 2017/0245174 A1* | 8/2017 | Jung ................ H04W 28/12 |
| 2018/0092090 A1* | 3/2018 | Li ..................... H04W 72/20 |
| 2019/0268128 A1 | 8/2019 | Zhou et al. |
| 2021/0306952 A1 | 9/2021 | Kuang et al. |

FOREIGN PATENT DOCUMENTS

| | | | |
|---|---|---|---|
| CN | 104244379 A | * | 12/2014 |
| CN | 106664565 A | | 5/2017 |
| CN | 108023714 A | | 5/2018 |
| CN | 104935044 B | | 10/2018 |
| CN | 108616653 A | | 10/2018 |
| CN | 108809777 A | | 11/2018 |
| CN | 109219116 A | | 1/2019 |
| CN | 110505679 A | | 11/2019 |

\* cited by examiner

POWER CONSUMPTION CONTROL METHOD, CHIP SYSTEM, AND TERMINAL DEVICE

CROSS-REFERENCE TO RELATED APPLICATIONS

This application is a National Stage of International Application No. PCT/CN2020/134564, filed on Dec. 8, 2020, which claims priority to Chinese Patent Application No. 202010005401.1, filed on Jan. 3, 2020, the disclosures of which are hereby incorporated herein by reference in their entireties.

TECHNICAL FIELD

This application relates to the field of terminal technologies, and in particular, to a power consumption control method, a chip system, and a terminal device.

BACKGROUND

With the intelligentization of terminal devices such as mobile phones, tablets, and wearable devices, terminal devices are becoming indispensable tools in people's life. Standby time is a major factor in selection of terminal devices. Therefore, how to prolong the standby time is a major research field for manufacturers.

SUMMARY

Embodiments of this application provide a power consumption control method, a chip system, and a terminal device, so as to reduce power consumption of the terminal device and prolong standby time.

According to a first aspect, this application provides a power consumption control method, where the method includes: A terminal device detects, a screen state and data traffic of the terminal device; and the terminal device switches from a normal working mode to a low power mode when the screen state is a screen-off state and the data traffic is less than or equal to a preset traffic threshold. In the low power mode, the terminal device does not receive downlink data, and current in a radio frequency path of the terminal device drops to a preset current, where the preset current is less than a current value of the radio frequency path in the normal working mode.

By using the power consumption control method provided in this application, the terminal device switches from the normal working mode to the low power mode when the terminal device is in the screen-off state and the data traffic is less than or equal to the traffic threshold, so that the current in the radio frequency path of the terminal device drops to the preset current, thereby reducing power consumption of the terminal device and prolonging standby time.

According to a second aspect, this application provides a terminal device, where the terminal device includes a processor and a memory, where the memory is configured to store instructions, and the processor is configured to read and execute the instructions in the memory to enable the terminal device to perform: detecting a screen state and data traffic of the terminal device; and switching the terminal device from a normal working mode to a low power mode when the screen state is a screen-off state and the data traffic is less than or equal to a preset traffic threshold. In the low power mode, the terminal device does not receive downlink data, and current in a radio frequency path of the terminal device drops to a preset current, where the preset current is less than a current value of the radio frequency path in the normal working mode.

The terminal device provided in this application can switch from the normal working mode to the low power mode when the terminal device is in the screen-off state and the data traffic is less than or equal to the traffic threshold, so that the current in the radio frequency path of the terminal device drops to the preset current, thereby reducing power consumption of the terminal device and prolonging standby time.

Based on the first aspect and the second aspect, optionally, after the terminal device switches from the normal working mode to the low power mode, when the terminal device detects that downlink data needs to be transmitted, the terminal device switches from the low power mode to the normal working mode to complete receiving of the downlink data, and remains in the normal working mode within a preset period.

Based on this optional manner, the terminal device can switch back to the normal working mode in time based on a burst service after entering the low power mode. This ensures that the terminal device can respond to an emergent task in time after entering the low power mode.

Optionally, after the terminal device switches from the normal working mode to the low power mode, when the terminal device detects that the subframe type of a current transmission time interval (TTI) is a preset subframe type, the terminal device switches from the low power mode to the normal working mode, and switches from the normal working mode to the low power mode when the current TTI ends.

Based on this optional manner, the terminal device can switch back to the normal working mode in time based on a specified subframe type after entering the low power mode. This ensures that the terminal device can respond to a specified subframe task in time after entering the low power mode.

Optionally, in the low power mode, the terminal device turns off radio frequency of the radio frequency path after completing receiving of downlink control information (DCI) within each TTI, where the DCI is used to indicate whether downlink data needs to be received.

Optionally, the terminal device switches an antenna diversity of the radio frequency path to the minimum antenna diversity when the terminal device switches to the low power mode; and after the terminal device switches from the normal working mode to the low power mode, the terminal device switches the antenna diversity of the radio frequency path to the maximum antenna diversity when the terminal device detects that downlink data needs to be transmitted.

Based on this optional manner, the terminal device can further reduce the power consumption and prolong the standby time.

Optionally, after the terminal device switches from the normal working mode to the low power mode, the terminal device switches from the low power mode to the normal working mode when the terminal device is switched from a screen-off state to a screen-on state.

Optionally, in the normal working mode, the terminal device receives downlink data.

According to a third aspect, this application provides a chip system applied to a terminal device, including an application processor (AP) and a modem, the AP detects the screen state of the terminal device; the AP detects data traffic of the terminal device when the terminal device is switched from the screen-on state to the screen-off state; the AP sends first indication information to the modem when the data traffic is less than or equal to a preset traffic threshold, the first indication information is used to instruct the modem to switch to a low power mode; the modem switches from the normal working mode to the low power mode after receiving the first indication information. In the low power mode, the modem does not receive downlink data, and current in a radio frequency path of the modem drops to a preset current, where the preset current is less than a current value of the radio frequency path in the normal working mode.

Optionally, in the low power mode, the modem turns off radio frequency of the radio frequency path after completing receiving of downlink control information (DCI) within each transmission time interval (TTI), where the DCI is used to indicate whether downlink data needs to be received.

Optionally, after the modem switches from the normal working mode to the low power mode, if the modem determines that the DCI received in a current TTI indicates that downlink data needs to be received, the modem switches from the low power mode to the normal working mode from the next TTI to complete receiving of the downlink data, and remains in the normal working mode within a preset period.

Optionally, after the modem switches from the normal working mode to the low power mode, if the modem determines that the subframe type of the current TTI is a preset subframe type, the modem switches from the low power mode to the normal working mode, and switches from the normal working mode to the low power mode when the current TTI ends.

Optionally, the modem switches an antenna diversity of the radio frequency path to the minimum antenna diversity when the modem switches from the normal working mode to the low power mode; and after the modem switches from the normal working mode to the low power mode, the modem switches the antenna diversity of the radio frequency path to the maximum antenna diversity when the modem detects that downlink data needs to be transmitted.

Optionally, the AP sends second indication information to the modem when the AP detects that the terminal device is switched from the screen-off state to the screen-on state, the second indication information is used to instruct the modem to switch to the normal working mode; and the modem switches from the low power mode to the normal working mode after receiving the second indication information.

Optionally, in the normal working mode, the terminal device receives downlink data.

According to a fourth aspect, this application provides where the computer readable storage medium stores a computer program, and when being executed by a processor, the computer program implements functions of the terminal device according to the second aspect or any optional manner of the second aspect.

According to a fifth aspect, an embodiment of this application provides a computer program product, where the program product includes a program, and when the program is run, functions of the terminal device according to the second aspect or any optional manner of the second aspect are enabled.

For technical effects brought by the third aspect to the fifth aspect provided in this application, refer to technical effects brought by the second aspect or implementations of the second aspect. Details are not described herein again.

DESCRIPTION OF EMBODIMENTS

Figure 1:
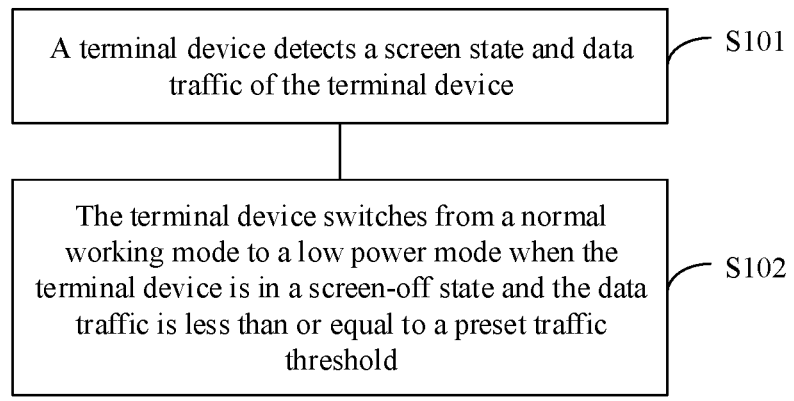
FIG. 1 is a first flowchart of a power consumption control method according to an embodiment of this application.

According to statistics, terminal devices are not transmitting services at least 98% of the time when they are in a screen-off state (also generally known as screen lock state or black screen state). Currently, to ensure that terminal devices can receive burst service data such as chat messages, emails and notifications from applications in time, the terminal devices are always ready to receive data even in the screen-off state. Therefore, this results in considerable unnecessary power consumption, and reduces standby time of the terminal devices.

To resolve this problem, this application provides a power consumption control method that enables a terminal device in a screen-off state to switch to a low power mode in which current in a radio frequency path drops to a preset current range and the terminal device does not receive downlink data, so as to reduce power loss of the terminal device in the screen-off state, thereby prolonging standby time of the terminal device.

Firstly, before introducing embodiments of the power consumption control method, a chip system, and a terminal device provided in this application, it is necessary to explain some of terms to be mentioned below. When the term "first" or "second" or another ordinal number is referred to in this application, it should be understood that such term is merely intended for distinction, unless a sequence is exactly expressed in the context.

The term "example" or "for example" is used here to mean serving as an example, instance, or illustration. Any embodiment or design solution described as "example" or "for example" in the embodiments of this application should not be construed as preferred or advantageous over other embodiments or design solutions. To be precise, the use of the word such as "example" or "for example" is intended to present a related concept in a specific manner.

Unless otherwise specified, "I" used herein generally indicates an "or" relationship between associated objects, for example, A/B may indicate either A or B. The term "and/or" is only used to describe an association relationship between associated objects, and indicates that three relationships may exist. For example, A and/or B may represent the following three cases: Only A exists, both A and B exist, and only B exists. In addition, in the description of this application, "a plurality of" means two or more.

Secondly, the power consumption control method provided in this application is applicable to terminal devices such as mobile phones, mobile computers, tablet computers and wearable devices. The power consumption control method supports fourth generation (4G) access technologies, such as long term evolution (LTE) access technology and LTE-Advanced (LTE-A) access technology; supports fifth generation (5G) access technologies, such as new radio (NR) access technology; and may further support a plurality of systems using wireless technology, such as systems using LTE-NR dual connectivity technology. Certainly, the power consumption control method may also support future-oriented communications technologies.

The power control method provided in this application is illustrated as an example below with reference to specific embodiments.

Figure 2:
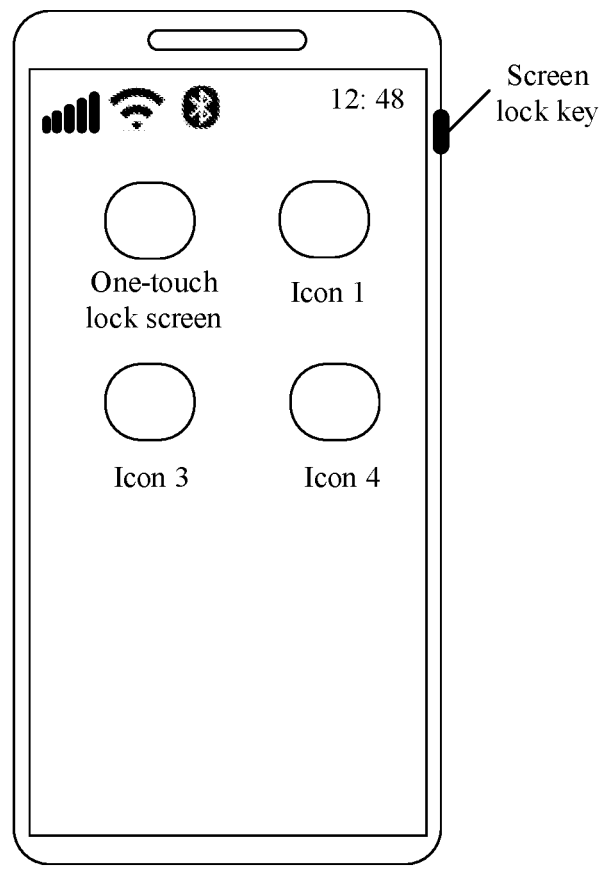
FIG. 2 is a schematic diagram of a screen lock key according to this application.

FIG. 1 is a flowchart of a power consumption control method according to an embodiment of this application. As shown in FIG. 2, the method includes:

S101: A terminal device detects a screen state and data traffic of the terminal device.

In one embodiment, when the terminal device determines, based on a user operation in a screen-on state, that a screen lock signal is triggered, the terminal device enters a screen lock and screen-off state. Therefore, the terminal device may determine the screen state based on a user operation. For example, when the terminal device detects a screen lock signal triggered by a user, it may be determined that the screen is switched from a screen-on state to a screen-off state. The screen lock signal may be triggered when the user presses a screen lock key, and the screen lock key may be a virtual key or a physical key.

For example, the virtual key may be an icon displayed on the screen of the terminal device. For example, as shown in FIG. 2, a "one-touch lock screen" icon is displayed on the screen of the terminal device. When the terminal device detects that the "one-touch screen lock" icon is clicked, the terminal device may control the screen to switch from the screen-on state to the screen-off state.

The physical key may be a dedicated screen control key or a power key with a screen control function. For example, as shown in FIG. 2, a physical key is provided on a side of the screen of the terminal device, and a screen-off signal is generated after the physical key is pressed. When the terminal device detects the screen-off signal, the terminal device determines that the screen is switched from the screen-on state to the screen-off state. Generally, when the power key of the terminal device is pressed for a long time (that is, longer than preset first duration, for example, 2 s), the terminal device may be controlled to power on, power off or restart. When the power key is clicked, the screen may be controlled to be on or off.

Optionally, the terminal device may alternatively detect screen lock time of the terminal device and determine the screen state. The screen lock time may be construed as a period in which no user operation is detected by the terminal device. When no user operation is detected within a preset screen lock time, the terminal device generally also enters a screen lock and screen-off state automatically. The preset screen lock time may be set by the user.

When detecting data traffic, the terminal device may detect data traffic by a built-in traffic detection application. In general, a traffic monitoring application counts all applications installed in the terminal device, makes statistics on traffic of each application, and also periodically adds up data traffic generated by all the applications within a period to obtain traffic statistics of the terminal device. The terminal device may then directly obtain the traffic statistics of the traffic monitoring application to determine data traffic of the terminal device.

In this embodiment of this application, the terminal device may detect the screen state first, and start detecting the data traffic when the screen state is switched from the screen-on state to the screen-off state.

For example, assuming that the terminal device determines that the screen is switched from the screen-on state to the screen-off state at time 1, the terminal device may detect data traffic within a specified period (for example, 5 s and 2 s) with the time 1 as the end time. The terminal device may alternatively detect data traffic within a specified period with the time 1 as the start time. Certainly, the terminal device may alternatively detect data traffic within a specified period with the time 1 as an intermediate time. This is not limited in this application.

Alternatively, the terminal device may detect whether the screen state is the screen-off state when the data traffic is detected to be less than or equal to a preset traffic threshold. Certainly, the terminal device may alternatively detect the data traffic and the screen state at the same time to determine the time when the data traffic is less than or equal to the preset traffic threshold and the screen state is the screen-off state.

S102: The terminal device switches from a normal working mode to a low power mode when the terminal device is in a screen-off state and the data traffic is less than or equal to a preset traffic threshold.

In this embodiment of this application, when a terminal is in the low power mode, current in a radio frequency (RF) path of the terminal device may drop to a preset current, and the terminal device may alternatively not receive downlink data, the preset current range is less than the current in the radio frequency path in the normal working mode (hereinafter referred to as normal working current). Downlink data refer to downlink data carried over a physical downlink shared channel (PDSCH).

In one embodiment, the terminal device may implement switching between the normal working mode and the low power mode by controlling the radio frequency path to turn on and turn off radio frequency.

In this embodiment, the normal working mode means that the radio frequency path turns on and off radio frequency in accordance with a conventional protocol (for example, LTE protocol or NR protocol). That is, the radio frequency path of the terminal device turns on radio frequency within each transmission time interval (TTI), and monitors downlink control information (DCI) carried over a physical downlink control channel (PDCCH).

DCI is a control signaling sent from a network device to a terminal device, and DCI in different formats indicates different control information. For example, a format 1 is used to indicate resource scheduling information of the PDSCH, including modulation and coding scheme (usually occupying 5 bits), number of hybrid automatic repeat request (HARQ) processes (usually occupying 4 bits), new data indication (usually occupying 1 bit to indicate whether downlink data needs to be transmitted), redundancy version (usually occupying 2 bits), physical uplink control channel (PUCCH) transmission power control command (usually occupying 2 bits), downlink allocation index (usually occupying 2 bits) and other fields. The terminal device may determine whether downlink data needs to be transmitted based on the DCI.

Based on a conventional protocol, a TTI includes 14 symbols, and the radio frequency path of the terminal device receives DCI at symbol 1, 2 or 3 within the TTI. For example, in LTE, the radio frequency path completes receiving of DCI within symbol 2 or 3. In NR, the radio frequency path completes receiving of DCI within symbol 1 or 2. After receiving the DCI, the terminal device keeps the radio frequency of the radio frequency path turned on and parses the DCI, and then determines whether downlink data needs to be transmitted based on a parsing result of the DCI.

If downlink data needs to be transmitted, the terminal device continues to turn on the radio frequency of the radio frequency path, and receives the downlink data from the corresponding PDSCH based on control information such as resource scheduling information and transmission format parsed from the DCI. That is, when data is being transmitted, the radio frequency path is in a radio frequency-on state throughout the TTI.

If no downlink data needs to be transmitted, the terminal device turns off the radio frequency of the radio frequency path at symbols 10 to 14 or at symbols 11 to 14. After the radio frequency is turned off, the radio frequency path cannot receive any data.

Figure 3:
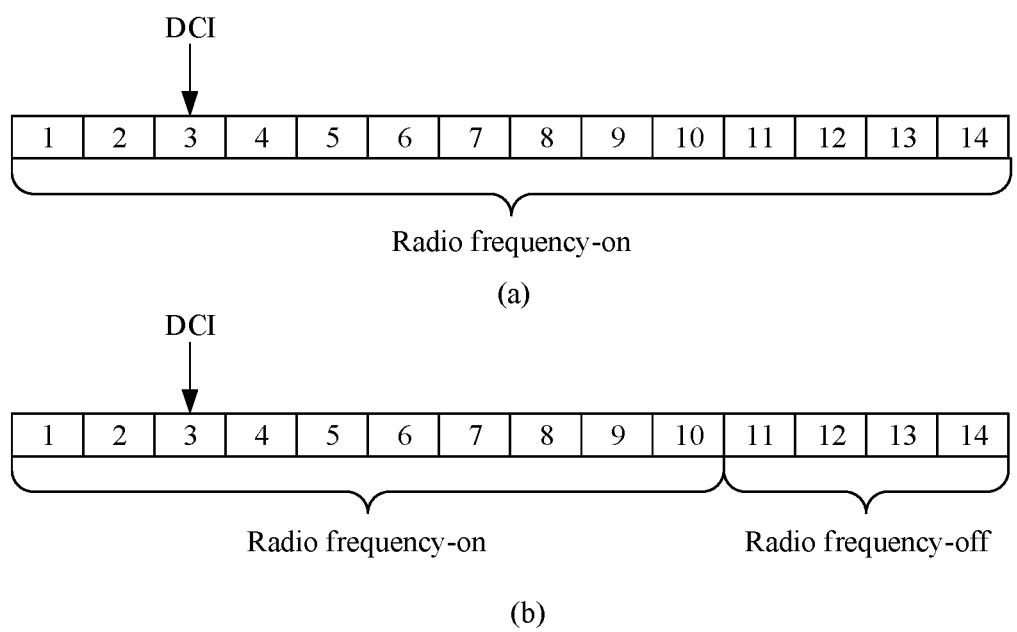
FIG. 3 is a schematic diagram of radio frequency in a normal working mode according to this application.

Using LTE as an example, the radio frequency path completes receiving of DCI at symbol 3, and then the terminal device parses the DCI to determine whether downlink data needs to be transmitted. If data is being transmitted, as shown in part (a) of FIG. 3, the radio frequency path is in a radio frequency-on state throughout the TTI. If there is no downlink data, the terminal device turns off the radio frequency of the radio frequency path at symbols 11 to 14 until it enters the next TTI, turns on the radio frequency again and continues to monitor the PDCCH. That is, as shown in part (b) FIG. 3, within the first 10 symbols of the TTI, the radio frequency path is in a radio frequency-on state, and within the last 4 symbols of the TTI, the radio frequency path is in a radio frequency-off state.

That is, in the normal working mode, if no downlink data needs to be transmitted, the radio frequency path has radio frequency 64.2% (9/14) of the time, or 71.4% (10/14) of the time. Assuming that the normal working current of the radio frequency path is A when data is being transmitted, the normal working current of the radio frequency path is 64.2%*A or 71.4%*A when no data is being transmitted.

In this embodiment, the low power mode refers to a mode in which the terminal device may turn off radio frequency of the radio frequency path after completing receiving of downlink control information (DCI) within each TTI. In the low power mode, the terminal device does not need to wait for completion of DCI parsing, and may turn off the radio frequency of the radio frequency path before the DCI parsing is completed.

For example, the terminal device may turn off the radio frequency of the radio frequency path immediately after receiving the DCI, that is, turn off the radio frequency from the first symbol after receiving the DCI.

Figure 4:
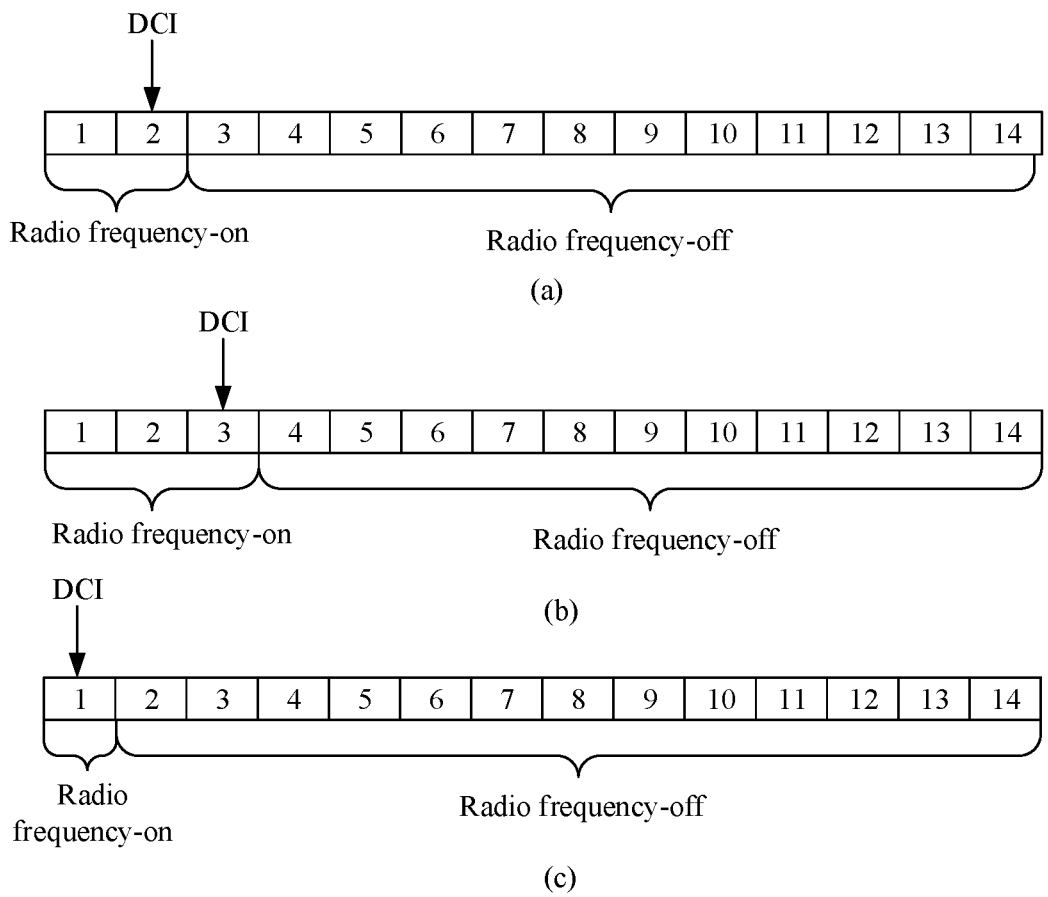
FIG. 4 is a first schematic diagram of radio frequency in a low power mode according to this application.

For example, in LTE, if the radio frequency path completes receiving of DCI at symbol 2 of the TTI, as shown in part (a) of FIG. 4, the radio frequency path is in a radio frequency-off state within the last 12 (14-2) symbols of the TTI from symbol 3, and cannot receive downlink data. That is, the radio frequency path has radio frequency 14.2% (2/14) of the time to monitor the DCI carried over the PDCCH. Compared with the normal working mode in LTE, current in the radio frequency path drops from 64.2%*A to 14.2%*A when no downlink data needs to be transmitted.

If the radio frequency path completes receiving of DCI at symbol 3 of the TTI, as shown in part (b) of FIG. 4, the radio frequency path is in a radio frequency-off state within the last 11 (14-3) symbols of the TTI from symbol 4, and cannot receive downlink data. That is, the radio frequency path has radio frequency 21.4% (3/14) of the time to monitor the DCI carried over the PDCCH. Compared with the normal working mode in LTE, current in the radio frequency path drops from 71.4%*A to 21.4%*A when no downlink data needs to be transmitted.

Likewise, in NR, if the radio frequency path completes receiving of DCI at symbol 1 of the TTI, as shown in part (c) of FIG. 4, the radio frequency path is in a radio frequency-off state within the last 13 (14-1) symbols of the TTI from symbol 2, and cannot receive downlink data. That is, the radio frequency path has radio frequency 7.1% (1/14) of the time to monitor the DCI carried over the PDCCH. Compared with the normal working mode in NR, current in the radio frequency path drops from 64.2%*A to 7.1%*A when no downlink data needs to be transmitted.

If the radio frequency path completes receiving of DCI at symbol 2 of the TTI, as shown in part (a) of FIG. 4, the radio frequency path is in a radio frequency-off state within the last 12 (14-2) symbols of the TTI from symbol 3, and cannot receive downlink data. That is, the radio frequency path has radio frequency 14.2% (2/14) of the time to monitor the DCI carried over the PDCCH. Compared with the normal working mode in NR, current in the radio frequency path drops from 71.4%*A to 14.2%*A when no downlink data needs to be transmitted.

Optionally, the terminal device may alternatively turn off the radio frequency from a specified symbol position after the radio frequency path receives the DCI. The specified symbol position is located at any symbol position ahead of symbol 9 after receiving the DCI.

Figure 5:
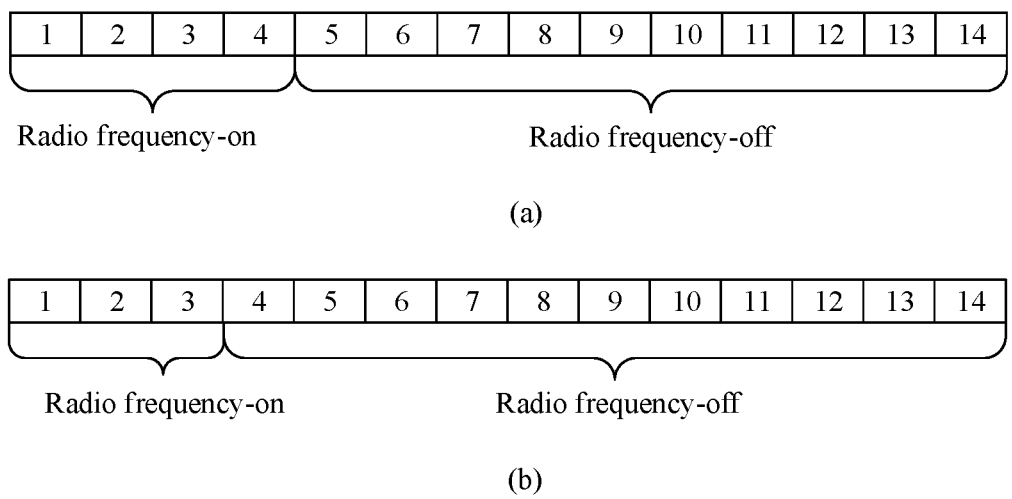
FIG. 5 is a second schematic diagram of radio frequency in a low power mode according to this application.

For example, in LTE, when a normal cyclic prefix (NCP) is used between symbols, as shown in part (a) of FIG. 5, after the radio frequency path receives DCI, the terminal device may turn off the radio frequency of the radio frequency path from symbol 5. Compared with the normal working mode in LTE, current in the radio frequency path drops from 64.2%*A to 28.6%*A, or from 71.4%*A to 28.6%*A when no downlink data needs to be transmitted.

When an extended cyclic prefix (ECP) is used between symbols, as shown in part (b) of FIG. 5, after the radio frequency path receives DCI, the terminal device may turn off the radio frequency of the radio frequency path from symbol 4. Compared with the normal working mode in LTE, current in the radio frequency path drops from 71.4%*A to 21.4%*A, or from 64.2%*A to 21.4%*A when no downlink data needs to be transmitted.

It may be learned that in the embodiment, when the terminal device switches from the normal working mode to the low power mode, the current in the radio frequency path of the terminal device drops greatly, for example, by more than 20%, compared with that in the normal working mode. Therefore, after switching to the low power mode, the terminal device can save more than 20% of power consumption, so as to prolong standby time.

In the low power mode, the terminal device does not receive downlink data. However, in the screen-off state, the terminal device also receives burst services and needs to receive downlink data. To reduce the impact of the low power mode on downlink data transmission, this application also provides an escape mechanism. That is, when the terminal device detects that downlink data needs to be transmitted, the terminal device switches from the low power mode to the normal working mode to complete receiving of the downlink data, and remains in the normal working mode within a preset period.

For example, after the terminal device switches to the low power mode, DCI is still received within each TTI. If, within a TTI (for example, TTI1), the terminal device finds that downlink data needs to be transmitted after parsing DCI, the terminal device may start an escape timer and may switch back to the normal working mode from the next TTI (for example, TTI2) of TTI1. The terminal device remains in the normal working mode until the escape timer expires.

For a network device that sends downlink data to the terminal device, when the network device detects that the terminal device does not receive the downlink data correctly within TTI1, the network-side device starts a retransmission mechanism and resends the downlink data within TTI2. Within TTI2, the terminal device has switched back to the normal working mode. Therefore, the terminal device may receive the downlink data normally.

Because the terminal device is in the screen-off state and the retransmission interval is only one TTI, a user using the terminal device is less likely to perceive that the downlink data is sent for retransmission. Therefore, the escape mechanism provided in this application for the low power mode can ensure the transmission of downlink data without affecting user experience.

In addition, even in the screen-off state, the terminal device also needs to perform a specified task in a subframe of a specified type. For example, the terminal device performs an EMU measurement task in an EMU measurement task subframe; performs a cell search task in a cell search task subframe; performs a paging task in a paging subframe; performs system information demodulation in a system information demodulation task subframe, for example, demodulation of master information blocks (MIB) or system information blocks (SIB); and performs channel state information-reference signals (CSI-RS) pilot configuration in a pilot configuration subframe. In these subframes of specified types, the terminal device can perform the corresponding tasks successfully only when the radio frequency path is in a radio frequency-on state. Therefore, the escape mechanism provided in this application may also include detection of subframes of specified types.

For example, the terminal device is previously provided with a subframe set including a plurality of predetermined subframe types, such as EMU measurement task subframe, cell search task subframe, paging subframe, system information demodulation task subframe, pilot configuration subframe and other subframe types. Certainly, in addition to the previously listed subframe types, the subframe set may include other subframe types that need to maintain radio frequency state. The specific subframe type may be set based on actual needs, and is not limited in this application.

While the terminal device is in the low power mode, the terminal device determines whether the subframe type of a current TTI belongs to the subframe set. If the subframe type of the current TTI is a preset subframe type in the subframe set, the terminal device switches from the low power mode to the normal working mode to perform a task corresponding to the preset subframe type. After receiving within the current TTI, the terminal device switches from the normal working mode to the low power mode.

Figure 6:
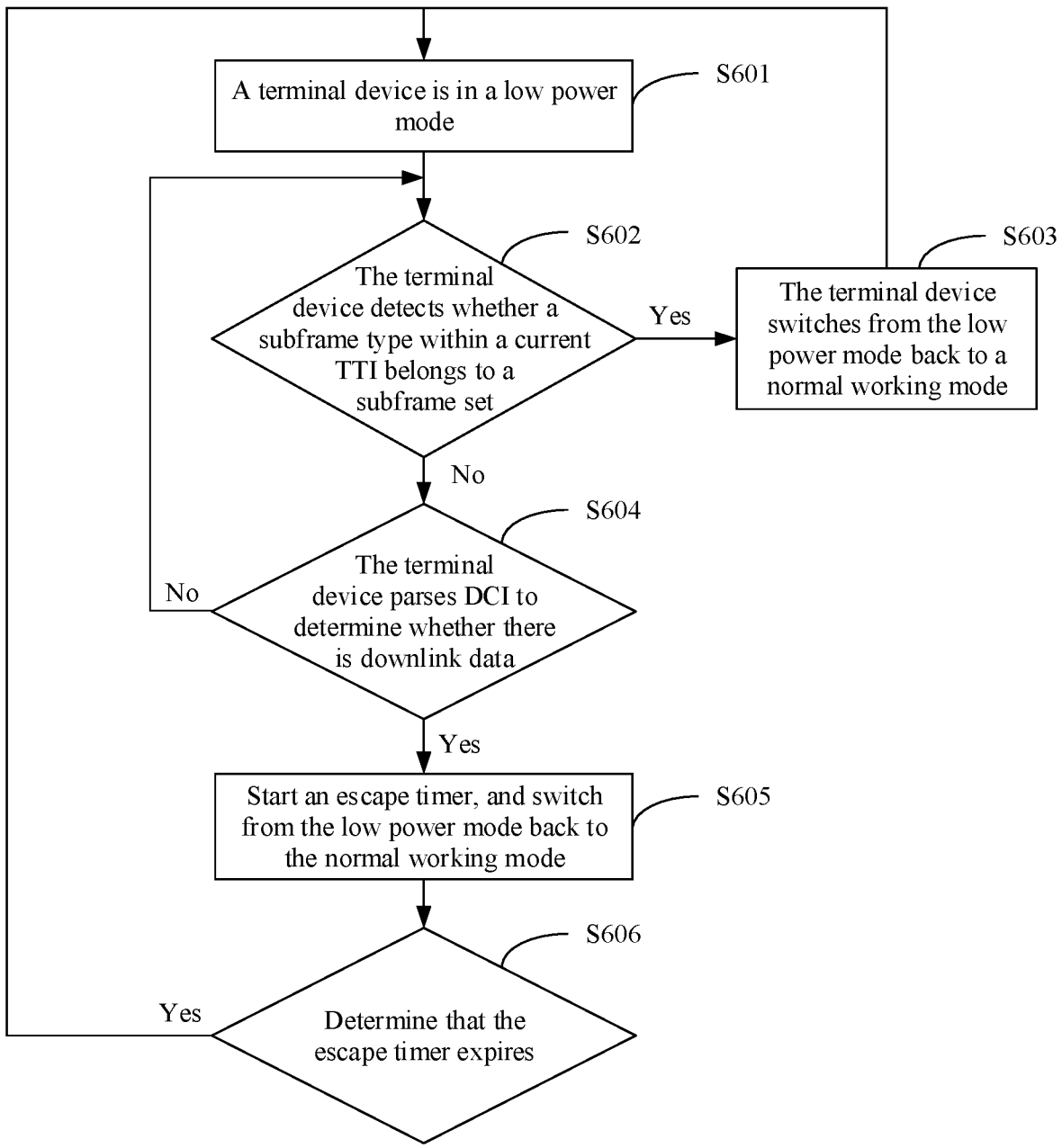
FIG. 6 is a second flowchart of a power consumption control method according to an embodiment of this application.

A workflow of the terminal device switched to the low power mode is illustrated as an example below with reference to the flowchart shown in FIG. 6. Referring to FIG. 6, the workflow of the terminal device includes:

S601: The terminal device is in a low power mode.

S602: The terminal device detects whether the subframe type within a current TTI belongs to the subframe set.

For example, the terminal device receives subframe matching information from a network device when the terminal device accesses a network, and the subframe matching information includes locations of some subframe types, such as the location of the pilot configuration subframe. Therefore, the terminal device may determine the subframe type within the current TTI based on the subframe matching information.

Alternatively, when the network device instructs some subframe tasks, the network device sends control information over a physical broadcast channel (PBCH). Therefore, when receiving the control information from the PBCH, the terminal device may determine the subframe type within the current TTI based on the control information.

The terminal device may perform S603 when determining that the subframe type within the current TTI belongs to the subframe set. The terminal device may perform S604 when determining that the subframe type within the current TTI does not belong to the subframe set.

S603: The terminal device switches from the low power mode back to the normal working mode.

It may be understood that after the terminal device switches back to the normal mode, when entering the next TTI, the terminal device may continue to detect the subframe type within the next TTI. If the subframe type within the next TTI does not belong to the subframe set, the terminal device may switch back to the low power mode again, or if the subframe type within the next TTI belongs to the subframe set, the terminal device still remains in the normal working mode.

S604: The terminal device parses DCI to determine whether there is downlink data.

If the DCI indicates that no downlink data needs to be transmitted, the terminal device may remain in the low power mode and return to S602 to start the next round of detection. If downlink data needs to be transmitted, the terminal device may perform S605.

S605: The terminal device starts an escape timer, and switches from the low power mode back to the normal working mode.

When detecting that downlink data needs to be transmitted, the terminal device may switch from the low power mode back to the normal working mode to receive the downlink data. In addition, the terminal device starts the escape timer for timing, and remains in the normal working mode during the timing period of the escape timer.

S606: The escape timer expires.

When the escape timer expires, the terminal device switch to the low power mode again to start the next round of detection from S601.

It should be noted that based on the escape mechanism provided in this application, it can be ensured that the terminal device can switch back to the normal working mode in time based on a burst service and a specified subframe type after entering the low power mode, so that the terminal device can respond to an emergent task and a specified subframe task in time even after entering the low power mode.

Optionally, the terminal device may alternatively reduce power consumption by reducing an antenna diversity of the radio frequency path. That is, when the terminal device switches to the low power mode, the terminal device switches the antenna diversity of the radio frequency path to the minimum antenna diversity.

For example, the radio frequency path of the terminal device supports three antenna diversities: 4Rx (4 receive antennas), 2Rx (2 receive antennas) and 1Rx (1 receive antenna). When the terminal device switches to the low power mode, the terminal device may directly switch a current antenna diversity to the minimum antenna diversity 1RX. If the current antenna diversity is 4Rx, after switching 4Rx to 1Rx, the terminal device may reduce the power consumption by 60% with the radio frequency turned off. If the current antenna diversity is 2Rx, after switching 2Rx to 1Rx, the terminal device may reduce the power consumption by 30% with the radio frequency turned off. Certainly, if the current antenna diversity is the minimum antenna diversity, the terminal device may keep the current antenna diversity unchanged when it is determined to switch to the low power mode.

After switching from the normal working mode to the low power mode, the terminal device may completely control the antenna diversity of the radio frequency path to the minimum antenna diversity if no downlink data is detected to be transmitted.

To ensure the bit error rate of DCI, the terminal device may alternatively adjust the size of the antenna diversity by detecting signal quality, such as received signal strength indication (RSSI), signal noise ratio (SNR) and signal to interference plus noise ratio (SINR).

Figure 7:
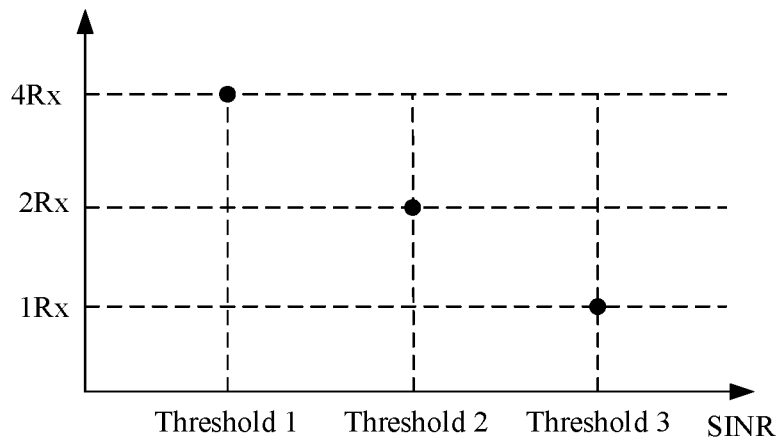
FIG. 7 is a schematic diagram of an antenna diversity threshold according to this application.

For example, SINR is used as an example, as shown in FIG. 7, the three antenna diversities 4Rx, 2Rx and 1Rx supported by the terminal device are set with a corresponding SINR threshold, respectively, that is, a threshold 1, a threshold 2 and a threshold 3. The SINR threshold may be configured by a network-side device to the terminal device, or may be pre-configured. When the terminal device is in the low power mode, the terminal device may periodically detect SINR.

When the current antenna diversity is 1Rx, if the terminal device detects that the SINR is less than the threshold 2 and greater than the threshold 1, then 1Rx is switched to 2Rx; if the SINR is detected to be less than the threshold 1, then 1Rx is switched to 4Rx; or if the SINR is detected to be greater than the threshold 2, then 1Rx is kept unchanged.

When the current antenna diversity is 2Rx, if the terminal device detects that the SINR is less than the threshold 3 and greater than the threshold 2, then 4Rx is switched to 2Rx; if the SINR is detected to be greater than the threshold 3, then 4Rx is switched to 1Rx; or if the SINR is detected to be less than the threshold 2, then 4Rx is kept unchanged.

When the current antenna diversity is 4Rx, if the terminal device detects that the SINR is less than the threshold 1, then 2Rx is switched to 4Rx; if the SINR is detected to be greater than the threshold 3, then 2Rx is switched to 1Rx; or if the SINR is detected to be greater than the threshold 1 and less than the threshold 3, then 2Rx is kept unchanged.

The setting of the SINR threshold and handover rules based on the SINR threshold may be set based on requirements of actual application, which is not limited in this application.

When the terminal device detects that downlink data needs to be transmitted, the terminal device may directly switch the antenna diversity of the radio frequency path to the maximum antenna diversity.

Figure 8:
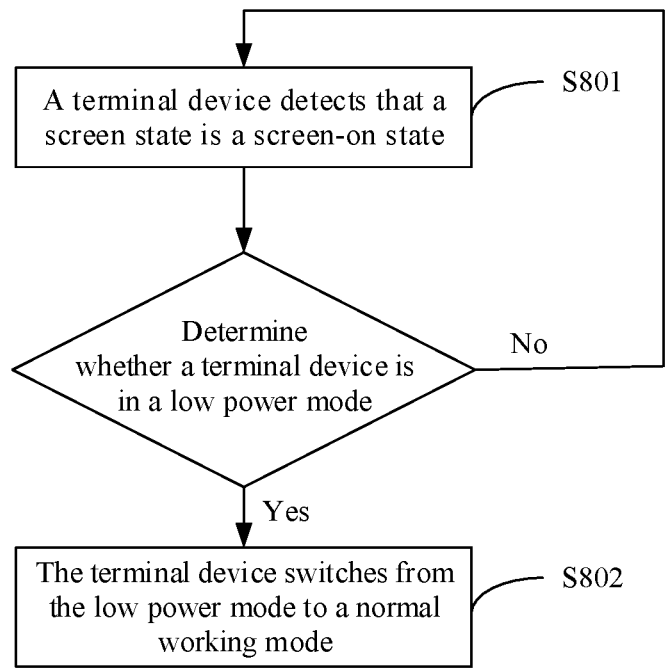
FIG. 8 is a third flowchart of a power consumption control method according to an embodiment of this application.

FIG. 8 is a flowchart of a power control method according to another embodiment of this application. The method includes:

S801: A terminal device detects that a screen state is a screen-on state. Next, S802 is performed.

For example, the terminal device may detect a screen lock key of the terminal device in the screen-off state. For example, the screen of the terminal device may be controlled to switch from the screen-off state to the screen-on state when the terminal device detects that the physical key is pressed in the screen-off state.

Alternatively, if the terminal device enables a screen-on reminder function for a specified application (for example, a social application), that is, when a chat message is received, the terminal device automatically turns on the screen-on state and displays the chat message on the screen. Then, the terminal device may be switched from the screen-off state to the screen-on state when detecting data of the specified application in the screen-off state.

S802: The terminal device switches from the low power mode to the normal working mode when the terminal device is in the low power mode.

In this embodiment, when it is found that the terminal device in the screen-on state is still in the low power mode, the terminal device may exit the low power mode and switch from the low power mode to the normal working mode.

To this end, according to the power control method provided in this application, the terminal device may switch between the normal working mode and the low power mode based on different screen states and different data transmission states. When the terminal device is in the screen-off state in which no downlink data is transmitted for most of the time, the terminal device switches to the low power mode to reduce power consumption of the terminal device, so as to prolong the standby time of the terminal device.

Figure 9:
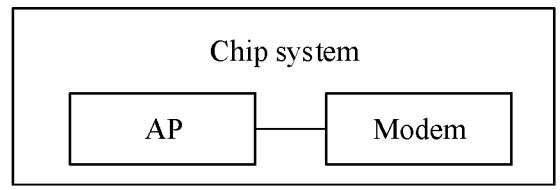
FIG. 9 is a schematic diagram of a chip system according to this application.

The following describes a chip system capable of implementing the power control method provided in this application, including an AP and a modem, as shown in FIG. 9.

The AP may include a central processing unit (CPU), a digital signal processor (DSP), an application specific integrated circuit (ASIC), a field-programmable gate array (FPGA) or another programmable logic device, discrete gate or transistor logic device, discrete hardware component, and the like. The AP is used to perform various functional applications and data processing of the terminal device, thereby controlling the operation of an operating system, a user interface and applications of the terminal device. The modem may also be referred to as a base band processor (BP), which is used to control the radio frequency path of the terminal device to perform operations such as data transceiving and signal modulation to implement a radio frequency communication function of the terminal device.

In this embodiment of this application, the AP may control the modem to switch between the normal working mode and the low power mode based on the screen state and data traffic of the terminal device to implement the power control method.

A control process of the AP for the modem and a workflow of the modem switched to the low power mode in the chip system provided in this application are illustrated as an example below with reference to the flowchart below.

Figure 10:
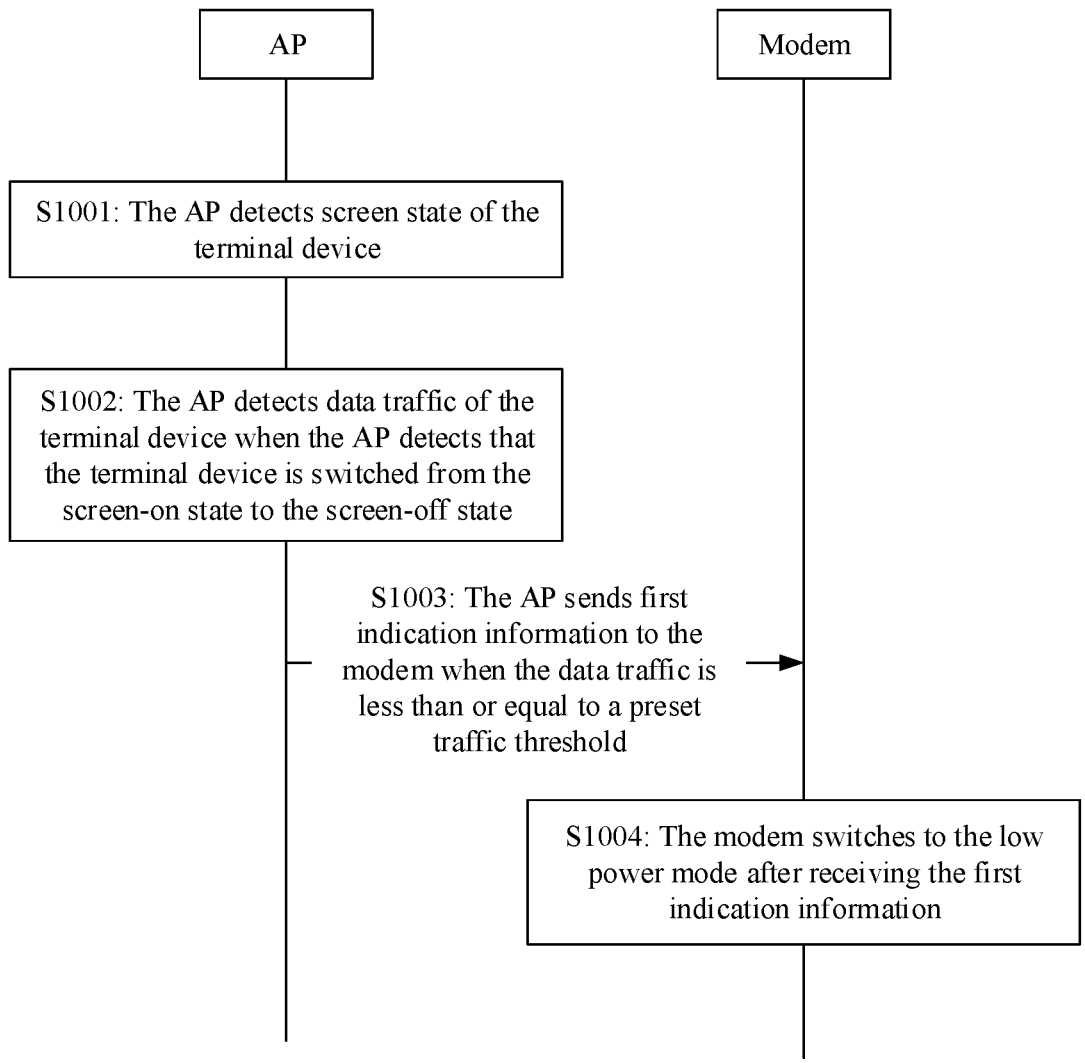
FIG. 10 is a first schematic diagram of a workflow of a chip system according to this application.

FIG. 10 is a flowchart of controlling the modem by the AP to switch to the low power mode according to an embodiment, including:

S1001: The AP detects screen state of the terminal device.

For example, the AP may detect the screen state by detecting a signal triggered by the screen lock key. For example, when the AP detects that the virtual key of the screen lock key displayed on the screen of the terminal device is clicked, the AP determines that the terminal device is switched from the screen-on state to the screen-off state. The physical key of the screen lock key (for example, a dedicated screen lock key or a power key with a screen lock function) is pressed to generate a screen-off signal, and when the AP detects the screen-off signal, the terminal device is determined to switch from the screen-on state to the screen-off state.

Alternatively, the AP may detect screen lock time of the terminal device. When the screen lock time of the terminal device is up, the AP may determine that the screen is switched from the screen-on state to the screen-off state.

S1002: The AP detects data traffic of the terminal device when the AP detects that the terminal device is switched from the screen-on state to the screen-off state.

When the AP determines that the terminal device is switched from the screen-on state to the screen-off state, the AP starts detecting data traffic. For example, if a traffic monitoring application is installed in the terminal device, the AP may directly obtain monitoring data of the traffic monitoring application. Alternatively, the AP may obtain statistics on data traffic transmitted by the modem over the radio frequency path, and the modem may collect traffic statistics by the size of uplink and downlink packets.

For example, assuming that the AP determines that the terminal device is switched from the screen-on state to the screen-off state at time 1, the AP may detect data traffic within a specified period (for example, 5 s and 2 s) with the time 1 as the end time. The terminal device may alternatively detect data traffic within a specified period with the time 1 as the start time. Certainly, the AP may alternatively detect data traffic within a specified period with the time 1 as an intermediate time. This is not limited in this application.

S1003: The AP sends first indication information to the modem when the data traffic is less than or equal to a preset traffic threshold, the first indication information is used to instruct the modem to switch to the low power mode.

S1004: The modem switches from the normal working mode to the low power mode after receiving the first indication information.

In the low power mode, the modem does not receive downlink data, and current in a radio frequency path of the modem drops to a preset current. For a specific implementation of the low power mode, refer to related description in step S102. Details are not described herein again.

In one example, to avoid a misjudgment of the AP, resulting in a reverse switch between the low power mode and the normal working mode, the AP may further confirm the working mode of the modem after detecting a change in the screen state of the terminal device.

For example, status record information may be set in the AP and the modem. The status record information in the AP is used to record whether mode switch indication information sent by the AP last time is first indication information or second indication information. If the first indication information is recorded in the status record information, it means that the first indication information was sent last time, and the AP may determine that the modem is currently in the low power mode. If the second indication information is recorded in the status record information, it means that the second indication information was sent last time, and the AP may determine that the modem is currently in the normal working mode. The AP will update status record information when sending mode switch indication information every time. The second indication information is used to instruct the modem to switch to the normal working mode.

The status record information in the modem is used to record the current working mode of the modem. When the modem receives the first indication information, the modem updates the status record information to the first indication information and switches to the low power mode. When the modem receives the second indication information, the modem updates the status record information to the second indication information and switches to the normal working mode.

For example, the mode switch indication information may be a flag, which represents the first indication information if the flag is "true" and represents the second indication information if the flag is "false".

Figure 11:
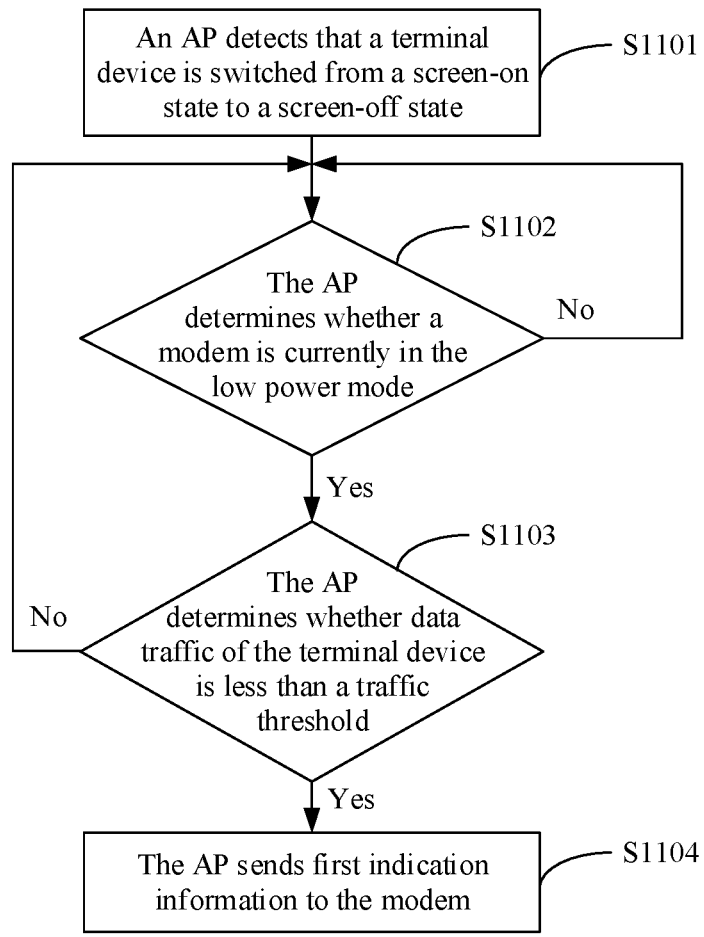
FIG. 11 is a second schematic diagram of a workflow of a chip system according to this application.

In the example, as shown in FIG. 11, a process of sending the first indication information by the AP may alternatively include:

S1101: The AP detects that the terminal device is switched from the screen-on state to the screen-off state.

S1102: The AP determines whether the modem is currently in the low power mode.

That is, the AP may first determine whether the modem is currently in the low power mode based on the status record information after detecting that the terminal device is switched from the screen-on state to the screen-off state. Data traffic of the terminal device will be further detected only when the modem is currently in the normal working mode, that is, when the flag is detected to be "false".

If the modem is currently in the normal working mode, the AP returns to perform S1102 to re-determine whether the modem is in the low power mode after delaying for a preset period. The AP performs S1103 if the modem is currently in the low power mode.

S1103: The AP determines whether data traffic of the terminal device is less than or equal to a traffic threshold.

The AP may perform S1104 if the AP detects that the data traffic of the terminal device is less than or equal to the traffic threshold. The AP may return to perform S1102 after delaying for a preset period if the data traffic of the terminal device is greater than the traffic threshold.

S1104: The AP sends first indication information to the modem.

In one example, the AP may send first indication information to the modem by using a shared memory. That is, the AP stores the first indication information into the shared memory of the terminal device, and the modem may obtain the first indication information from the shared memory.

Figure 12:
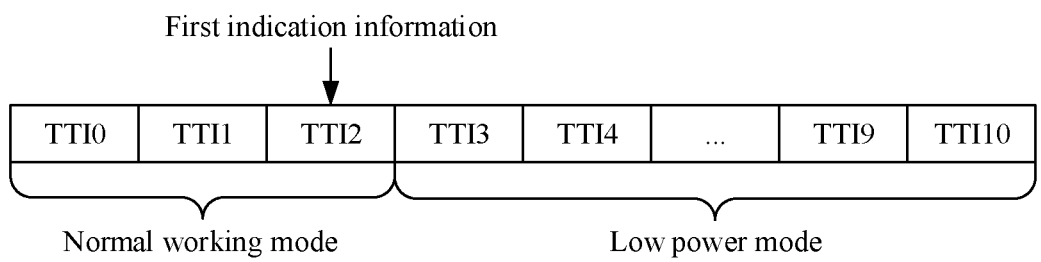
FIG. 12 is a first schematic diagram of switching in a low power mode according to this application.

For the modem, after receiving the first indication information, the modem may directly switch to the low power mode. For example, as shown in FIG. 12, assuming that the modem receives the first indication information sent by the AP within TTI2, the modem switches to the low power mode from the first TTI (assumed to be TTI3) after TTI2.

Alternatively, the modem may detect data first to determine a switching time after receiving the first indication information, and then switch to the low power mode after determining the switching time.

For example, after receiving the first indication information, the modem may first detect, in a sliding decision window, whether there is at least one DCI indicating that downlink data needs to be transmitted. If none of DCIs in the sliding decision window indicates that downlink data is being transmitted, the modem switches to the low power mode from a TTI corresponding to the sliding decision window.

The sliding decision window of a TTI refers to a period made up of M (M>0) consecutive TTIs ahead of the TTI.

For example, if M=3, TTI0-TTI10 is 11 consecutive TTIs. TTI0-TTI2 is a sliding decision window of TTI3, TTI1-TTI3 is a sliding decision window of TTI4, TTI2-TTI4 is a sliding decision window of TTI5, and by analogy, TTI7-TTI9 is a sliding decision window of TTI10. If the modem receives the first indication information sent by the AP within TTI2, the modem detects data from the first TTI, that is, TTI3, after TTI2, and determines the TTI in which mode switch is performed. That is, the modem first determines whether at least one of three DCIs received in the sliding decision window TTI0-TTI2 of TTI3 indicates that downlink data is being transmitted. If none of the DCIs indicates that downlink data is being transmitted, the modem may determine that the TTI in which mode switch is performed is TTI3. The modem switches to the low power mode from TTI3.

Figure 13:
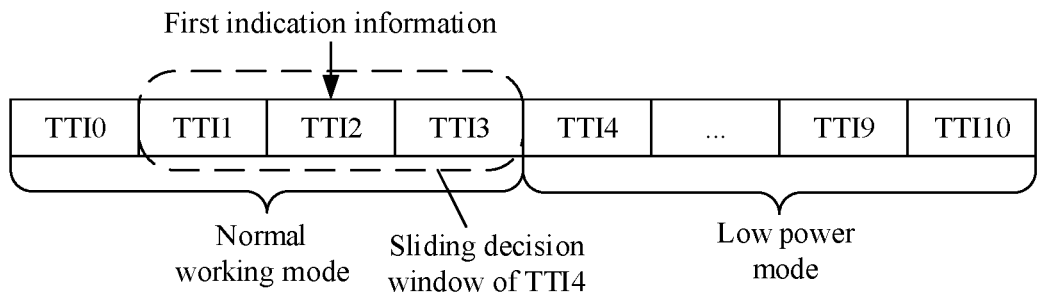
FIG. 13 is a second schematic diagram of switching in a low power mode according to this application.

If any one of the three DCIs received in the sliding decision window of TTI3 indicates that downlink data needs to be transmitted, as shown in FIG. 13, the modem continues to detect whether TTI4 is the TTI in which mode switch is performed. That is, the modem determines whether at least one of the three DCIs received in the sliding decision window TTI1-TTI3 of TTI4 indicates that downlink data is being transmitted. If none of the DCIs indicates that downlink data is being transmitted, the modem may determine that the TTI in which mode switch is performed is TTI4. The modem switches to the low power mode from TTI4.

If any one of the three DCIs received in the sliding decision window of TTI4 indicates that downlink data is being transmitted, the modem continues to detect whether TTI5 is the TTI in which mode switch is performed. The foregoing operation is repeated until the TTI in which mode switch is performed is determined, and the modem is switched to the low power mode from the TTI.

After receiving the first indication information, the modem can further ensure that no downlink data needs to be transmitted when switching to the low power mode by detecting data in the sliding decision window, thereby avoiding the impact of the low power mode on downlink data transmission of the terminal device during switching.

In actual application, the terminal device may alternatively receive burst services at any time even in the screen-off state, and downlink data needs to be received. After receiving DCI, the modem turns off radio frequency of the radio frequency path without completing parsing of the DCI. Therefore, when the modem completes the parsing of the DCI and finds that downlink data needs to be transmitted, the modem cannot control the radio frequency path to receive downlink data from a specified PDSCH.

To reduce the impact of the low power mode on downlink data transmission, the chip system provided in this application is also provided with an escape mechanism. That is, when the modem detects that downlink data needs to be transmitted, the modem switches from the low power mode to the normal working mode to complete receiving of the downlink data, and remains in the normal working mode within a preset period.

For example, when the modem is in the low power mode, the modem parses DCI in the radio frequency-off state after receiving the DCI within each TTI. If, within a current TTI, the modem determines that there is downlink data transmission by parsing the DCI, the modem may start an escape mechanism. That is, the modem starts an escape timer and switches back to the normal working mode from the next TTI, so as to receive the downlink data indicated by the DCI. The modem remains in the normal working mode until the escape timer expires.

For example, within TTI11, the modem monitors the PDCCH in the low power mode, and turns off radio frequency after receiving DCI11. The modem determines that downlink data is being transmitted by parsing the DCI11, then immediately starts the escape timer, and switches back to the normal working mode from the next TTI (assumed to be TTI12), so as to receive the downlink data indicated by the DCI11. Assuming that the escape timer is timed for 20 TTIs, then the modem remains in the normal working mode during the 20 TTIs from TTI12 to TTI32 after the escape timer is started.

For a network device that transmits downlink data to the terminal device, when the network device detects that the terminal device does not receive the downlink data correctly within TTI11, the network-side device starts a retransmission mechanism and resends the downlink data within TTI12. Because the terminal device is in the screen-off state and the retransmission interval is only one TTI, a user using the terminal device is less likely to perceive that the downlink data is sent for retransmission. Therefore, the escape mechanism of the chip system provided in this application may ensure downlink data transmission without affecting user experience.

It may be understood that during the timing of the escape timer, the first indication information is still recorded in the status record information of the modem if the AP does not send the second indication information. Then, after the escape timer expires, the modem automatically switches back to the low power mode based on the first indication information recorded in the status record information.

Correspondingly, during the timing of the escape timer, if the AP sends the second indication information to instruct the modem to switch to the normal working mode, the modem updates the status record information based on the second indication information. After the escape timer expires, the modem remains in the normal working mode based on the second indication information recorded in the status record information.

In addition, even in the screen-off state, the terminal device also needs to perform a specified task in a subframe of a specified type. For example, the terminal device performs an EMU measurement task in an EMU measurement task subframe; performs a cell search task in a cell search task subframe; performs a paging task in a paging subframe; performs system information demodulation in a system information demodulation task subframe, for example, demodulation of MIB or SIB; and performs CSI-RS pilot configuration in a pilot configuration subframe. In these subframes, the modem needs to maintain the radio frequency state to perform the corresponding tasks successfully. Therefore, the escape mechanism set up in the chip system provided in this application may further include detection of subframes of specified types.

For example, the modem is previously provided with a subframe set including a plurality of predetermined subframe types, such as EMU measurement task subframe, cell search task subframe, paging subframe, system information demodulation task subframe, pilot configuration subframe or other subframe types. Certainly, in addition to the previously listed subframe types, the subframe set may include other subframe types that need to maintain radio frequency state.

The specific subframe type may be set based on actual needs, and is not limited in this application.

In the low power mode, the modem determines, within each TTI, whether the subframe type of the TTI belongs to the subframe set. If the subframe type of the TTI is a subframe type in the subframe set, the modem switches to the normal working mode within the TTI to perform a task corresponding to the preset subframe type. After receiving within the TTI, the modem switches from the normal working mode to the low power mode.

Figure 14:
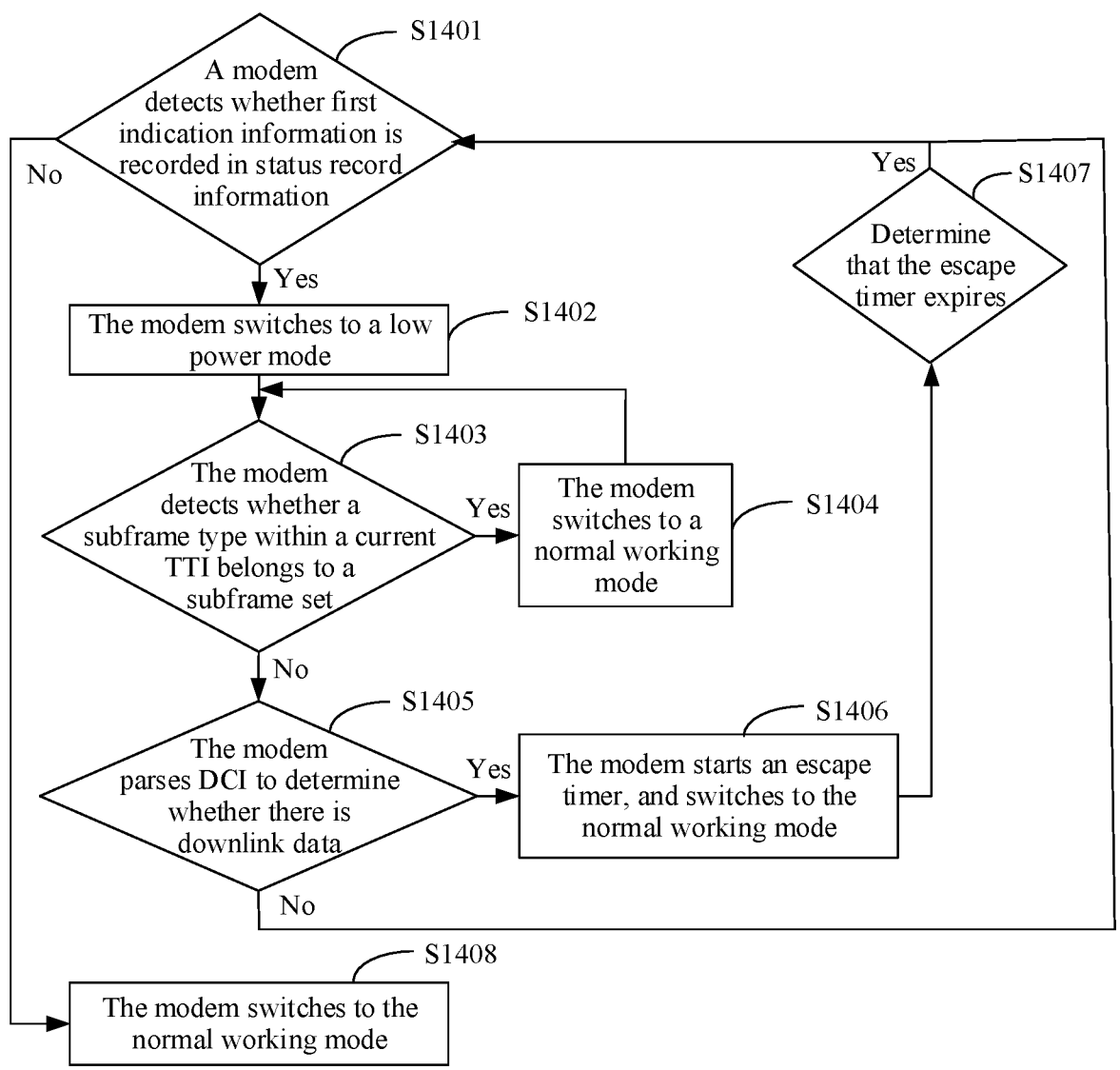
FIG. 14 is a third schematic diagram of a workflow of a chip system according to this application.

A workflow of the modem switched to the low power mode is illustrated as an example below with reference to the flowchart shown in FIG. 14. Referring to FIG. 14, the workflow of the modem includes:

S1401: The modem detects whether first indication information is recorded in status record information.

The modem may perform S1402 when detecting that the first indication information is recorded in the status record information. The modem may perform S1408 when detecting that the second indication information is recorded in the status record information.

S1402: The modem switches to the low power mode.

S1403: The modem detects whether the subframe type within a current TTI belongs to the subframe set.

The modem may perform S1404 when determining that the subframe type within the current TTI belongs to the subframe set. The modem may perform S1405 when determining that the subframe type within the current TTI does not belong to the subframe set.

S1404: The modem switches to the normal working mode.

It may be understood that after the modem switches back to the normal mode, when entering the next TTI, the modem may continue to detect the subframe type within the next TTI. If the subframe type within the next TTI does not belong to the subframe set, the terminal device may switch back to the low power mode again, that is, return to perform S1402, or if the subframe type within the next TTI belongs to the subframe set, the terminal device still remains in the normal working mode.

S1405: The modem parses DCI to determine whether there is downlink data.

If the DCI indicates that no downlink data needs to be transmitted, the modem may remain in the low power mode and return to S1041 to start the next round of detection. If downlink data needs to be transmitted, the terminal device may perform S1406.

S1406: The modem starts an escape timer, and switches to the normal working mode.

When detecting that downlink data needs to be transmitted, the modem may switch from the low power mode back to the normal working mode to receive the downlink data. In addition, the modem starts the escape timer for timing, and remains in the normal working mode during the timing period of the escape timer.

S1407: The modem determines that the escape timer expires.

When the modem determines that the escape timer expires, the modem may return to perform S1041 for the next round of detection.

S1408: The modem switches to the normal working mode.

It may be learned that based on the escape mechanism provided in this application, the modem can switch back to the normal working mode in time based on a burst service and a specified subframe type after entering the low power mode, so that the radio frequency path can respond to an emergent task and a specified subframe task in time even after entering the low power mode.

Optionally, the modem may alternatively reduce power consumption by reducing an antenna diversity of the radio frequency path. That is, when the modem switches to the low power mode, the modem switches the antenna diversity of the radio frequency path to the minimum antenna diversity.

For example, the radio frequency path supports three antenna diversities: 4Rx (4 receive antennas), 2Rx (2 receive antennas) and 1Rx (1 receive antenna). When the modem switches to the low power mode, the modem may directly switch a current antenna diversity to the minimum antenna diversity 1RX. If the current antenna diversity is 4Rx, after switching 4Rx to 1Rx, the modem may reduce the power consumption by 60% with the radio frequency turned off. If the current antenna diversity is 2Rx, after switching 2Rx to 1Rx, the modem may reduce the power consumption by 30% with the radio frequency turned off. Certainly, if the current antenna diversity is the minimum antenna diversity, the modem may keep the current antenna diversity unchanged when it is determined to switch to the low power mode.

After switching from the normal working mode to the low power mode, the modem may completely control the antenna diversity of the radio frequency path to the minimum antenna diversity if no downlink data is detected to be transmitted.

Alternatively, to ensure the bit error rate of DCI, the modem may alternatively adjust the size of the antenna diversity in real time based on signal to interference plus noise ratio (SINR).

Specifically, for the way in which the modem adjusts the size of the antenna diversity in real time based on SINR, refer to the description in the above example shown in FIG. 7. Details are not described herein again.

When the modem detects that downlink data needs to be transmitted, the modem may directly switch the antenna diversity of the radio frequency path to the maximum antenna diversity.

This embodiment mainly describes the workflow of the AP controlling the modem to switch to the low power mode and the modem in the low power mode. A process of the AP controlling the modem to switch to the normal working mode is illustrated as an example below.

In a possible implementation, when the AP detects that the terminal device is switched from the screen-off state to the screen-on state, the AP may send second indication information to the modem to instruct the modem to switch to the normal working mode.

In another possible implementation, when the terminal device is switched from the screen-off state to the screen-on state, the AP sends second indication information when it is determined that the modem is in the low power mode to control the modem to switch from the low power mode to the normal working mode.

Figure 15:
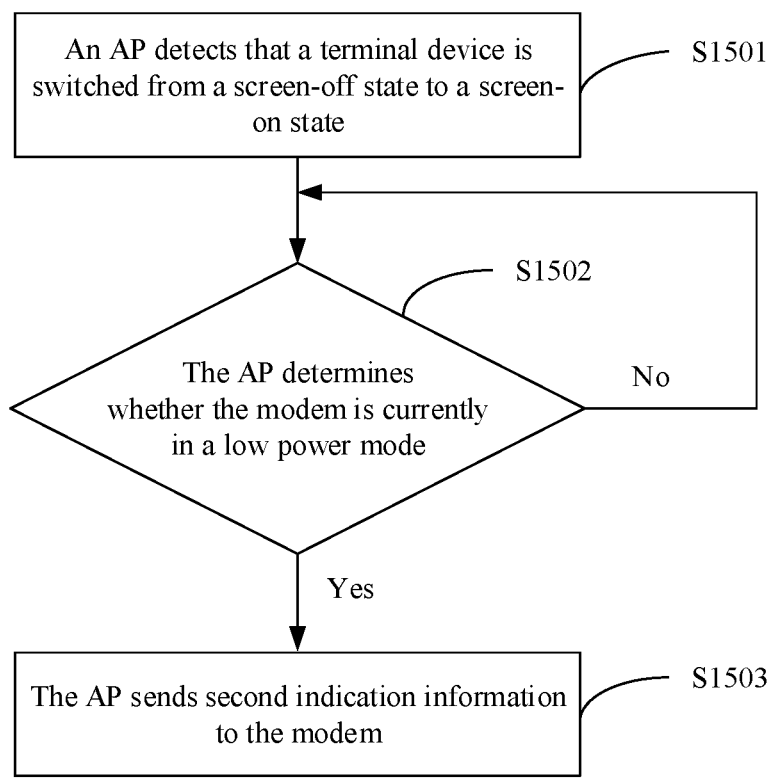
FIG. 15 is a fourth schematic diagram of a workflow of a chip system according to this application.

For example, as shown in FIG. 15, the process of sending the second indication information by the AP may include:

S1501: The AP detects that the AP is switched from the screen-off state to the screen-on state.

For example, the AP may detect a screen lock key of the AP in the screen-off state. For example, the screen of the terminal device may be controlled to switch from the screen-off state to the screen-on state when the AP detects that the physical key is pressed in the screen-off state.

Alternatively, if the terminal device enables a screen-on reminder function for a specified application (for example, a social application), that is, when a chat message is received, the terminal device automatically turns on the screen-on state and displays the chat message on the screen, then the AP may control the terminal device to switch from the screen-off state to the screen-on state when detecting data of the specified application in the screen-off state.

S1502: The AP determines whether the modem is currently in the low power mode.

Correspondingly, the AP may first determine whether the modem is currently in the low power mode based on the status record information after detecting that the terminal device is switched from the screen-on state to the screen-off state. The second indication information is sent only when the modem is currently in the low power mode, for example, when a flag is detected to be "true".

S1503: The AP sends the second indication information to the modem.

To this end, for the chip system provided in this application, the AP controls the modem to switch between the normal working mode and the low power mode to adapt to the terminal device in different screen states and different data transmission states. When the terminal device is in the screen-off state in which no data is transmitted for most of the time, the AP controls the modem to switch to the low power mode to achieve the effect of reducing power consumption of the modem and prolonging the standby time of the terminal device.

This application further provides a terminal device, where the terminal device may be a mobile phone, a tablet computer, a laptop, a wearable device or a robot.

A part of the structure of the terminal device associated with the embodiments of this application is described below as an example with reference to FIG. 16.

Figure 16:
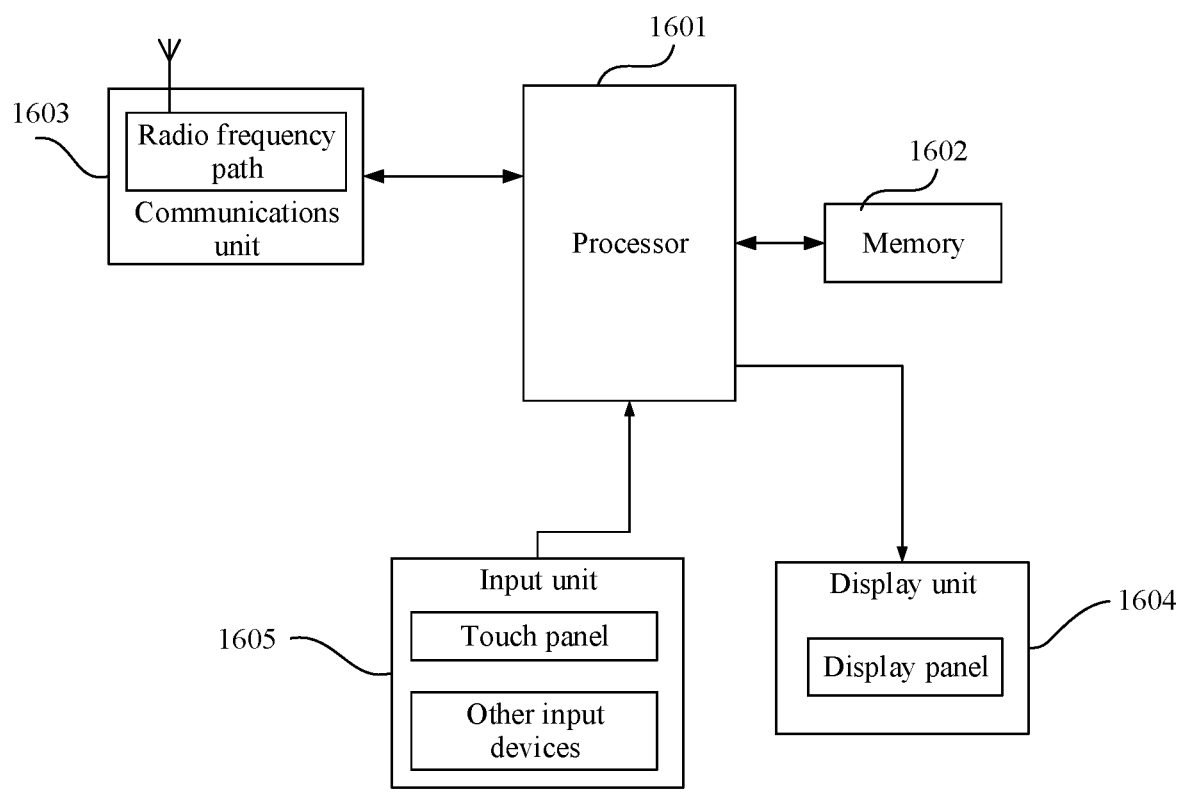
FIG. 16 is a schematic structural diagram of a terminal device according to this application.

As shown in FIG. 16, the terminal device includes a processor 1601, a communications unit 1603, a memory 1602, a display unit 1604, an input unit 1605 and other components. It may be understood by a person skilled in the art that the structure of the terminal device shown in FIG. 16 does not constitute a limitation on the terminal device. The terminal device may include more or fewer components than those illustrated, or combine some components, or have a different component arrangement.

As a control center of the terminal device, the processor 1601 is connected to parts of the terminal device by various interfaces and lines to perform functions and process data of the terminal device by running or executing software programs and/or modules stored in the memory 1602, and calling data stored in the memory 1602, thereby monitoring the terminal device as a whole. Optionally, the processor 1601 may include at least one of the following types: a central processing unit (CPU), a digital signal processor (DSP), a microprocessor, an application-specific integrated circuit (ASIC), a microcontroller unit (MCU), a field programmable gate array (FPGA), or an integrated circuit for implementing logic operations. For example, the processor 1601 may be a single-CPU processor or a multi-CPU processor. Optionally, the processor 1601 may also include the chip system shown in FIG. 9.

The communications unit 1603 may be configured to transceive information under the control of the processor 1601, including transmitting the received information to the processor 1601 for processing, and then sending the information transmitted by the processor 1601 to other communications devices. The communications unit 1603 usually includes a radio frequency path including but not limited to an antenna, at least one amplifier, a transceiver, a coupler, an low noise amplifier (LNA) and a duplexer. In addition, the communications unit 1603 may communicate with a network and other devices through wireless communication. The wireless communication may use any communication standard or protocol, including but not limited to GSM (global system of mobile communication), GPRS (general packet radio service, general packet radio service), CDMA (code division multiple access), WCDMA (wideband code division multiple access), LTE (long term evolution), e-mail, SMS (short messaging service) and short range communications technology.

The memory 1602 may include at least one of the following types: read-only memory (ROM) or other types of static storage devices that may store static information and instructions, random access memory (RAM) or other types of dynamic storage devices that may store information and instructions, or electrically erasable programmable read-only memory (EEPROM). In some scenarios, the memory may alternatively be, but is not limited to, a compact disc read-only memory (CD-ROM) or other optical disc memory, compact disc memory (including compact discs, laser discs, optical discs, digital versatile discs and Blu-ray discs), magnetic disc storage medium or other magnetic storage devices, or any other medium that can be used to carry or store desired program codes in the form of instructions or data structures and that can be accessed by a computer.

The memory 1602 may be stand-alone and connected to the processor 1601. Optionally, the memory 1602 may alternatively be integrated with the processor 1601, for example, integrated into a chip. The memory 1602 can store computer executable instructions for executing the technical solutions in the embodiments of this application, the execution is controlled by the processor 1601, and the executed computer executable instructions may alternatively be considered as drivers for the processor 1601. For example, the processor 1601 is configured to execute computer executable instructions stored in the memory 1602 to implement method processes shown in FIG. 10, FIG. 11, FIG. 12 and FIG. 13 in the embodiments of this application.

The input unit 1605 may be configured to receive input digital or character information, and generate a key signal input related to user settings and function control of the terminal device. Specifically, the input unit 1605 may include a touch screen and other input devices. A touch screen, also referred to as a touch panel, may collect a user's touch operations on or near the touch screen (for example, a user's operations on or near the touch screen using any suitable object or accessory such as a finger and a stylus), and drive a corresponding connected device based on a predetermined program. Optionally, the touch screen may include two parts: a touch detector and a touch controller. The touch detector detects a touch position of the user, detects a signal from a touch operation, and transmits the signal to the touch controller. The touch controller receives touch information from the touch detector, converts the touch information into contact coordinates, then sends the contact coordinates to the processor 1601, and can receive and execute commands sent from the processor 1601. In addition, the touch screen may be implemented into several types such as resistive type, capacitive type, infrared type and surface acoustic wave type. In addition to the touch screen, the input unit 1605 may include other input devices. Specifically, another input device may include, but is not limited to, one or more of a physical keyboard, function key (for example, volume control key and power on/off key) and the like.

The display unit 1604 may be configured to display information entered by the user or provided to the user and all menu bars and/or icons of the terminal device. The display unit 1604 may include a display panel. Optionally, the display panel may be configured in the form of an LCD (liquid crystal display) or an OLED (organic light-emitting diode). Further, the touch screen may cover the display panel, and the touch screen, upon detection of a touch operation on or near the touch screen, transmits the touch operation to the processor 1601 to determine the type of a touch event, and then the processor 1601 provides a corresponding visual output on the display panel based on the type of the touch event. Though in FIG. 16, the touch screen and the display panel implement input and output functions of the terminal device as two separate components, in some embodiments, the touch screen may be integrated with the display panel to implement the input and output functions of the terminal device.

An embodiment of this application further provides a computer readable storage medium. All or some of the methods described in the embodiments may be implemented by software, hardware, firmware, or any combination thereof. If the methods are implemented by software, functions may be stored on or transmitted over the computer readable medium as one or more instructions or codes. The computer readable medium may include a computer storage medium and a communication medium, and may further include any medium that may transmit a computer program from one place to another. The storage medium may be any available medium that can be accessed by a computer.

In an optional design, the computer readable medium may include RAM, ROM, EEPROM, CD-ROM or other optical disc memory, magnetic disc memory or other magnetic storage devices, or any other medium that may be used to carry or store desired program codes in the form of instructions or data structures and that may be accessed by a computer. In addition, any connection is appropriately referred to as a computer readable medium. For example, if software is transmitted from a website, a server or other remote sources by using a coaxial cable, an optical fiber cable, a twisted pair, a digital subscriber line (DSL) or wireless technologies (for example, infrared, radio and microwave), then the coaxial cable, the optical fiber cable, the twisted pair, the DSL or wireless technologies such as infrared, radio and microwave are included in the definition of medium. As used herein, magnetic and optical discs include compact disc (CD), laser disc, optical disc, digital versatile disc (DVD), floppy disc and Blu-ray disc, the magnetic disc usually reproduces data magnetically, while the optical disc reproduces data optically using lasers. The foregoing combinations should also be included in the scope of the computer readable medium.

An embodiment of this application further provides a computer program product. All or some of the methods described in the embodiments may be implemented by software, hardware, firmware, or any combination thereof. If the methods are implemented by software, all or some of the methods described in the embodiments may be implemented in the form of a computer program product. The computer program product includes one or more computer instructions. All or some of the processes or functions described in the method embodiments are generated when the foregoing computer program instructions are loaded and executed on a computer. The computer may be a general-purpose computer, a special-purpose computer, a computer network, a network device, a user equipment or other programmable device.

The objectives, technical solutions and beneficial effects of the present disclosure are further described in detail in the foregoing specific implementations. It should be understood that the foregoing descriptions are merely specific implementations of the present disclosure, but are not intended to limit the protection scope of the present disclosure. Based on the technical solutions of the present disclosure, any modification, equivalent replacement, and improvement made shall fall within the protection scope of the present disclosure.

What is claimed is:

1. A power consumption control method, the method comprising:
   detecting, by a terminal device, a screen state and data traffic of the terminal device;
   switching, by the terminal device, a working mode of the terminal device from a normal working mode to a low power mode in response to the screen state being a screen-off state and the data traffic being less than or equal to a preset traffic threshold, wherein in the low power mode, the terminal device does not receive downlink data and current in a radio frequency path of the terminal device drops to a preset current, and wherein the preset current is less than a current value of the radio frequency path in the normal working mode;
   switching, by the terminal device, an antenna diversity of the radio frequency path to a minimum antenna diversity in response to the terminal device switching to the low power mode; and
   after the terminal device switches from the normal working mode to the low power mode, switching, by the terminal device, the antenna diversity of the radio frequency path to a maximum antenna diversity in response to the terminal device detecting that the downlink data needs to be transmitted to the terminal device.

2. The method according to claim 1, wherein after the switching the working mode of the terminal device from the normal working mode to the low power mode, the method further comprises:
   in response to the terminal device detecting that the downlink data needs to be transmitted, switching, by the terminal device, the working mode of the terminal device from the low power mode to the normal working mode to complete receiving of the downlink data, and keeping the terminal device in the normal working mode within a preset period.

3. The method according to claim 1, wherein after the switching the working mode of the terminal device from the normal working mode to the low power mode, the method further comprises:
   in response to the terminal device detecting that a subframe type of a current transmission time interval (TTI) is a preset subframe type, switching, by the terminal device, the working mode of the terminal device from the low power mode to the normal working mode, and switching, by the terminal device, the working mode of the terminal device from the normal working mode to the low power mode in response to the current TTI ending.

4. The method according to claim 1, wherein in the low power mode, the terminal device turns off radio frequency of the radio frequency path after completing receiving of downlink control information (DCI) within each transmission time interval (TTI), wherein the DCI is used to indicate whether the downlink data needs to be received.

5. The method according to claim 1, wherein after the switching the terminal device from the normal working mode to the low power mode, the method further comprises:

switching the working mode of the terminal device from the low power mode to the normal working mode in response to the terminal device being switched from the screen-off state to a screen-on state.

6. The method according to claim 1, wherein in the normal working mode, the terminal device receives the downlink data.

7. A chip system applied to a terminal device, the chip system comprising:
an application processor (AP); and
a modem;
wherein:
the AP detects screen state of the terminal device, the screen state comprising a screen-on state or a screen-off state;
the AP detects data traffic of the terminal device in response to the terminal device being switched from the screen-on state to the screen-off state;
the AP sends first indication information to the modem in response to the data traffic being less than or equal to a preset traffic threshold, the first indication information being used to instruct the modem to switch to a low power mode;
the modem switches from a normal working mode to the low power mode in response to receiving the first indication information;
in the low power mode, the modem does not receive downlink data and current in a radio frequency path of the modem drops to a preset current, wherein the preset current is less than a current value of the radio frequency path in the normal working mode;
the modem switches an antenna diversity of the radio frequency path to a minimum antenna diversity in response to the modem switching from the normal working mode to the low power mode; and
after the modem switches from the normal working mode to the low power mode, the modem switches the antenna diversity of the radio frequency path to a maximum antenna diversity in response to the modem detecting that the downlink data needs to be transmitted to the terminal device.

8. The chip system according to claim 7, wherein in the low power mode, the modem turns off radio frequency of the radio frequency path after completing receiving of downlink control information (DCI) within each transmission time interval (TTI), wherein the DCI is used to indicate whether the downlink data needs to be received.

9. The chip system according to claim 8, wherein after the switches from the normal working mode to the low power mode, in response to the modem determining that the DCI received in a current TTI indicates that the downlink data needs to be received, the modem switches from the low power mode to the normal working mode from a next TTI after the current TTI to complete receiving of the downlink data, and remains in the normal working mode within a preset period.

10. The chip system according to claim 8, wherein after the modem switches from the normal working mode to the low power mode, in response to the modem determining that a subframe type of the current TTI is a preset subframe type, the modem switches from the low power mode to the normal working mode, and switches from the normal working mode to the low power mode in response to the current TTI ending.

11. The chip system according to claim 7, wherein:
the AP sends second indication information to the modem in response to the AP detecting that the terminal device is switched from the screen-off state to the screen-on state, the second indication information being used to instruct the modem to switch to the normal working mode; and
the modem switches from the low power mode to the normal working mode in response to receiving the second indication information.

12. The chip system according to claim 7, wherein in the normal working mode, the modem receives the downlink data.

13. A terminal device, comprising:
a processor; and
a memory, wherein the memory is configured to store instructions, and the processor is configured to read and execute the instructions stored in the memory to enable the terminal device to perform:
detecting a screen state and data traffic of the terminal device;
switching a working mode of the terminal device from a normal working mode to a low power mode in response to the screen state being a screen-off state and the data traffic being less than or equal to a preset traffic threshold, wherein in the low power mode, the terminal device does not receive downlink data and current in a radio frequency path of the terminal device drops to a preset current, wherein the preset current is less than a current value of the radio frequency path in the normal working mode;
switching an antenna diversity of the radio frequency path to a minimum antenna diversity in response to the terminal device switching to the low power mode; and
after the terminal device switches from the normal working mode to the low power mode, switching the antenna diversity of the radio frequency path to a maximum antenna diversity in response to the terminal device detecting that the downlink data needs to be transmitted to the terminal device.

14. The terminal device according to claim 13, wherein after the terminal device switches from the normal working mode to the low power mode, in response to the terminal device detecting that the downlink data needs to be transmitted, the terminal device switches from the low power mode to the normal working mode to complete receiving of the downlink data, and remains in the normal working mode within a preset period.

15. The terminal device according to claim 13, wherein after the terminal device switches from the normal working mode to the low power mode, in response to the terminal device detecting that a subframe type of a current transmission time interval (TTI) is a preset subframe type, the terminal device switches from the low power mode to the normal working mode, and switches from the normal working mode to the low power mode in response to the current TTI ending.

16. The terminal device according to claim 13, wherein in the low power mode, the terminal device turns off radio frequency of the radio frequency path after completing receiving of downlink control information (DCI) within each transmission time interval (TTI), wherein the DCI is used to indicate whether the downlink data needs to be received.

17. The terminal device according to claim 13, wherein after the terminal device switches from the normal working mode to the low power mode, the terminal device switches from the low power mode to the normal working mode in response to the terminal device being switched from the screen-off state to a screen-on state.

\* \* \* \* \*

UNITED STATES PATENT AND TRADEMARK OFFICE
CERTIFICATE OF CORRECTION

PATENT NO. : 12,200,625 B2
APPLICATION NO. : 17/774819
DATED : January 14, 2025
INVENTOR(S) : E et al.

Page 1 of 1

It is certified that error appears in the above-identified patent and that said Letters Patent is hereby corrected as shown below:

In the Claims

Claim 9, Column 23, Line 49: "switches from the normal working mode to the low power" should read -- modem switches from the normal working mode to the low power --.

Signed and Sealed this
Eighteenth Day of February, 2025

Coke Morgan Stewart
*Acting Director of the United States Patent and Trademark Office*